United States Patent [19]

Ida

[11] Patent Number: 4,827,365

[45] Date of Patent: May 2, 1989

[54] ASSEMBLY FOR ACCESSING INFORMATION RECORDING MEDIUM

[75] Inventor: Masatoshi Ida, Hachioji, Japan

[73] Assignee: Olympus Optical Co., Inc., Tokyo, Japan

[21] Appl. No.: 77,594

[22] Filed: Jul. 24, 1987

[51] Int. Cl.⁴ ............................................. G11B 5/55
[52] U.S. Cl. .................................. 360/106; 360/109; 369/215; 369/249
[58] Field of Search ....................... 360/106, 107, 109; 369/215, 244, 249

[56] References Cited

U.S. PATENT DOCUMENTS

| | | | |
|---|---|---|---|
| 3,767,848 | 10/1973 | Schuller et al. | 369/215 |
| 3,882,541 | 5/1975 | Ghose et al. | 360/106 |
| 3,924,063 | 12/1975 | Simons | 369/44 |
| 3,925,603 | 12/1975 | Naruse et al. | 369/46 |
| 4,131,923 | 12/1978 | Wachs et al. | 360/106 |
| 4,315,289 | 2/1982 | Holecek et al. | 360/106 |
| 4,383,283 | 5/1983 | Machut | 360/106 |
| 4,408,312 | 10/1983 | Sugiyama et al. | 369/43 |
| 4,651,247 | 3/1987 | Fuke | 360/106 |
| 4,701,818 | 10/1987 | Gitzendanner | 360/106 |

FOREIGN PATENT DOCUMENTS

| | | |
|---|---|---|
| 59-3754 | 1/1984 | Japan . |
| 59-3752 | 1/1984 | Japan . |
| 59-3753 | 1/1984 | Japan . |
| 59-2253 | 6/1984 | Japan . |
| 60-64464 | 5/1985 | Japan . |
| 60-67562 | 5/1985 | Japan . |
| 60-67564 | 5/1985 | Japan . |
| 60-186557 | 12/1985 | Japan . |
| 60-192160 | 12/1985 | Japan . |
| 60-192161 | 12/1985 | Japan . |
| 60-192162 | 12/1985 | Japan . |
| 60-192163 | 12/1985 | Japan . |
| 60-192168 | 12/1985 | Japan . |
| 61-6966 | 1/1986 | Japan . |
| 61-6967 | 1/1986 | Japan . |
| 61-6968 | 1/1986 | Japan . |
| 62-22769 | 2/1987 | Japan . |

Primary Examiner—Patrick R. Salce
Assistant Examiner—Anita M. Ault

[57] ABSTRACT

An assembly for accessing information recording tracks of an information storage medium comprises a transducer for recording and/or reproducing information; a transducer support carriage for advancing the transducer; a driving force generator for producing a driving force to shift the carriage; and motion converting means for converting an input motion from the driving force generating means to an output motion to be transmitted to the carriage. The motion converting means includes a cam with a spiraling peripheral surface having a plurality of fine step pitch shifting regions for precise tracking control and at least one rough pitch shifting region for shifting the transducer quickly from track to track on the recording medium.

6 Claims, 4 Drawing Sheets

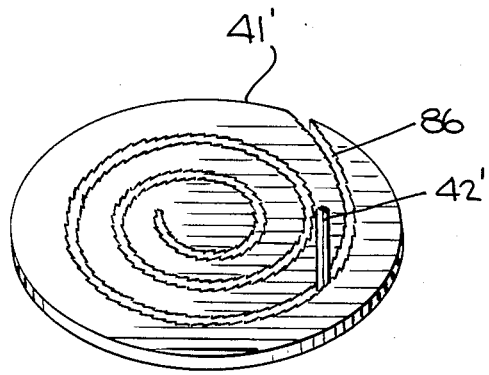
Fig. 3.
Fig. 4.
PRIOR ART
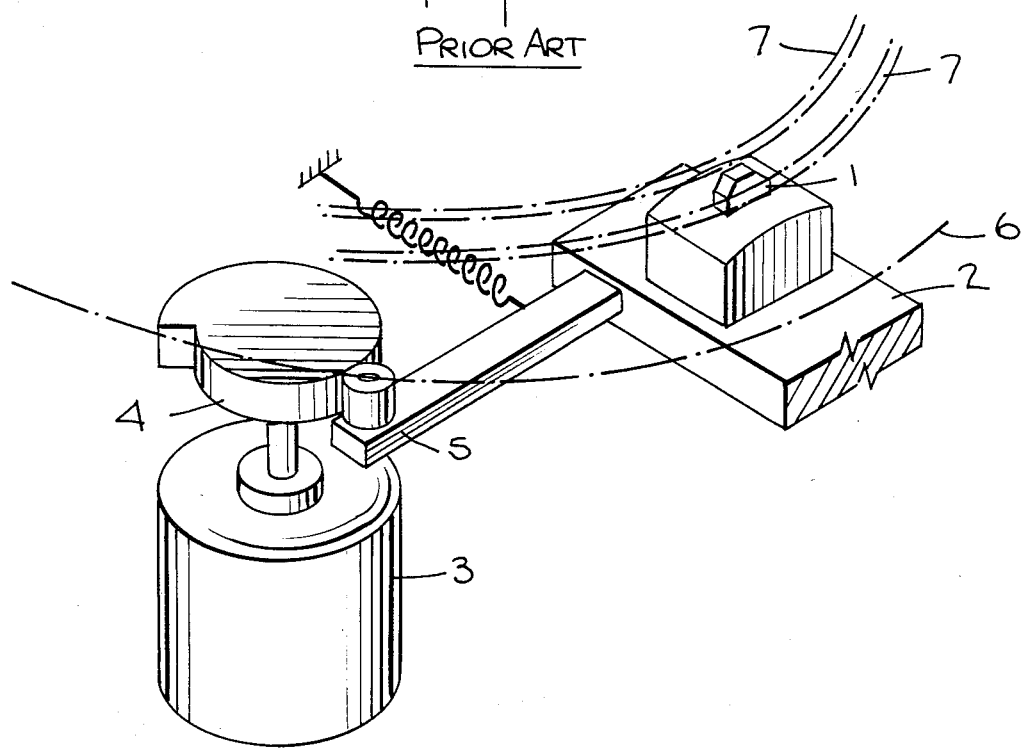

ASSEMBLY FOR ACCESSING INFORMATION RECORDING MEDIUM

BACKGROUND OF THE INVENTION

1. Field of the Invention

This invention relates to an assembly for accessing an information recording medium, i.e , to an accessing device with a transducer for an apparatus for recording and/or reproducing information on a recording medium.

2. Description of Prior Art

In a recording and/or reproducing apparatus such as an electronic still camera, a magnetic disc apparatus, an optical disc apparatus, etc., there is provided a transducer, such as a magnetic head, a photodetector, etc., for recording and/or reproducing information on a recording medium, and various accessing devices with transducers have been proposed with mechanisms for shifting the transducer from track to track on the medium. As illustrated in FIG. 4, a transducer accessing device of this type includes a magnetic head as a transducer 1, a movable transducer carriage 2 for supporting the transducer 1, a motor 3, and a motion converting element 4 such as a disc cam or a cylindrical cam driven by the motor 3 to provide the carriage 2 with a predetermined displacement. In the illustrated device, the rotational motion of the motor 3 is converted to linear motion in the direction of movement of the carriage 2, i.e., in the radial direction of a disc-shaped recording medium 6, by a cam 4 and a cam follower 5. Therefore, in response to the rotation of the motor 3, the transducer 1 supported by the carriage 2 moves between a plurality of tracks 7 formed on the recording medium 6. Conventionally, the motion converting cam element has been of the type that the distance from its axis to its peripheral surface, which rollingly contacts the cam follower, increases linearly in proportion to the angle of rotation from a reference position. Thus the relationship between the quantity of displacement of the transducer 1 and the angle of rotation of the motor 3, hence the cam 4, is linear, as shown in FIG. 5.

Stepping motors have been widely used in implementing precision motions because stepping motors can be controlled relatively precisely by open loop control systems. However, when a stepping motor is used for the motor 3 in the above-described device, the following problem arises: as shown in FIG. 6, the relationship between the number of pulses supplied to the stepping motor and the corresponding angle of rotation is not an accurate stepwise relationship, but is represented by a curve including superimposed transient ripple components. Therefore the carriage 2 does not stop at a predetermined position corresponding to the number of supplied pulses and it is difficult to position the transducer 1 correctly with respect to a desired track on the medium 6.

In order to avoid this drawback, Japanese Laid-Open Patent Publication No. 3754/1984 has proposed that the cam 4, which has a smooth peripheral surface for providing linear characteristics as shown in FIG. 5, is replaced by a cam as shown in FIG. 8 having stepwise shifting characteristics as shown in FIG. 7. When the transducer is at a predetermined track position, the movement of the carriage is interrupted to prevent unnecessary movement due to the ripple rotational motion of the motor from being transmitted to the transducer.

However, when a motion converting element (cam) having the characteristics shown in FIG. 7 is used, a new problem arises since in the range where no displacement occurs in response to the rotation of the motor (hereinafter called "pause range"), the position of the transducer will not change even if the angle of rotation of the motor is slightly varied. In an apparatus of this type, when information is reproduced by the transducer from a track formed on the medium, so-called tracking control is necessary for finely controlling the position of the transducer, for example, in response to the envelope of reproduced signals obtained by the head 1. As stated above, however, when the rotational position of the motor is in the pause range as shown in FIG. 7, fine control of the transducer position is impossible, and tracking control is accordingly difficult to achieve. On the other hand, when the characteristics of the motion converting element are selected as shown in FIG. 9 such that the output displacement changes with very small steps in a generally linear relationship with the number of pulses supplied to the motor, a relatively precise tracking control is possible. (In FIG. 9, the unit of the horizontal axis is the number of the steps of rotation of the stepping motor representing the angular position of the cam and the unit of the vertical axis is the track number on the medium representing the output displacement). In this case, however, many input pulses must be supplied to shift the transducer from one track (the n-th track) to the next track (the n+1-th track) Accordingly, the speed at which the information bearing tracks are accessed via the transducer is greatly reduced. Low speed of transducer accessing is a serious drawback for a device in the storage portion of a recording and reproducing apparatus.

SUMMARY OF THE INVENTION

An object of the present invention is to provide an improved assembly for accessing an information recording medium by which a highly precise tracking control and a high speed accessing by a transducer can be achieved.

According to the present invention, an accessing device comprises a transducer for recording and/or reproducing information on a recording medium; a transducer support carriage for advancing the transducer in a direction intersecting successive tracks formed on the recording medium; driving force generating means for generating driving force to bring about a displacement of the transducer support carriage; and motion converting means for converting an input motion from the driving force generating means to an output motion to be transmitted to the transducer support carriage with conversion characteristics including a plurality of fine step pitch shifting regions spaced from each other and at least one rough pitch shifting region linking the fine step pitch shifting regions.

BRIEF DESCRIPTION OF THE DRAWINGS

FIG. 3 is a perspective view of a motion converting mechanism in another embodiment of the invention;

FIG. 4 is a partial perspective view showing a conventional information track accessing device;

DESCRIPTION OF THE PREFERRED EMBODIMENTS

Systems in accordance with the invention may be used in a number of information recording and/or reproducing apparatus which include transducers for accessing information on recording media, for example, optical reproducing systems disclosed in U.S. Pat. Nos. 3,924,063 and 3,925,603, a mechanical reproducing system disclosed in U.S. Pat. No. 3,767,848 or an electrostatic capacitance type reproducing system disclosed in U.S. Pat. No. 4,408,312, but particularly useful applications are found in electronic cameras or compact type floppy disc drive systems.

Figure 1A:
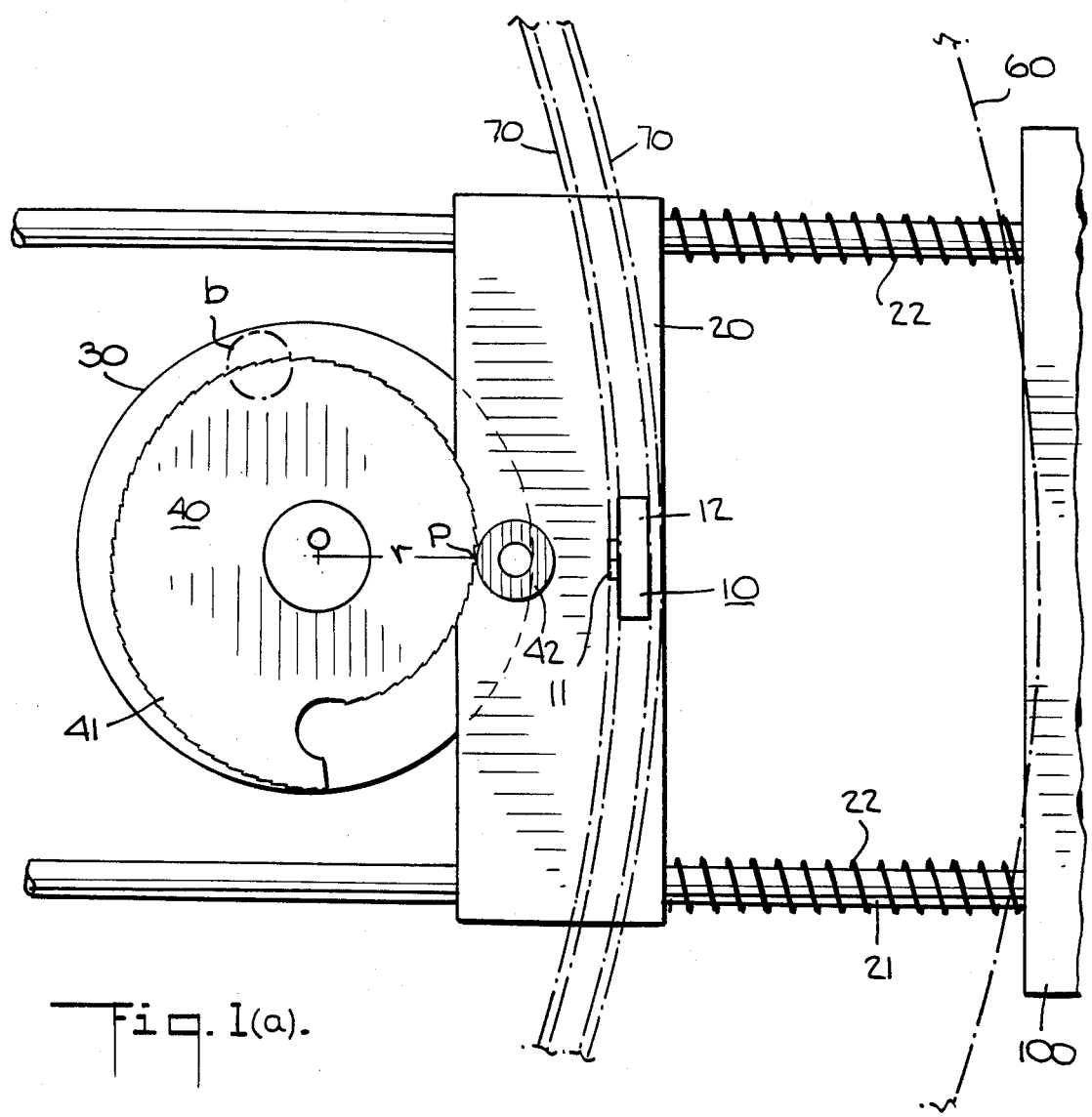
FIG. 1(a) is a plan view showing the main part of an assembly or device for accessing an information recording medium according to the present invention.
Figure 1B:
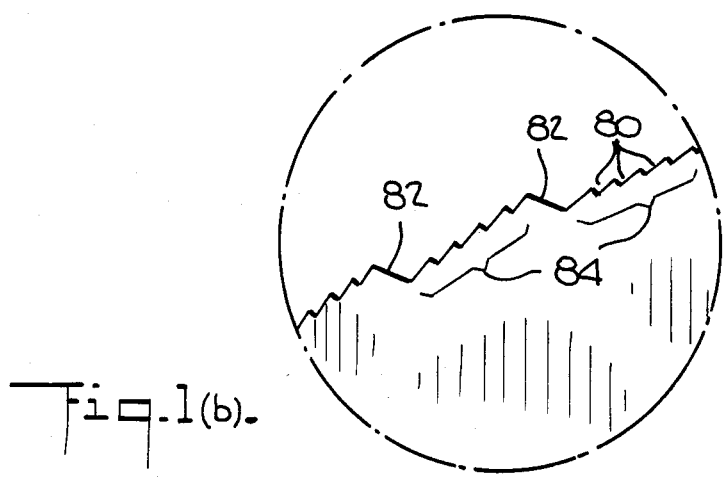
FIG. 1(b) is a detailed plan view, on an enlarged scale, of a portion b of a cam in FIG. 1 (a)
Figure 2:
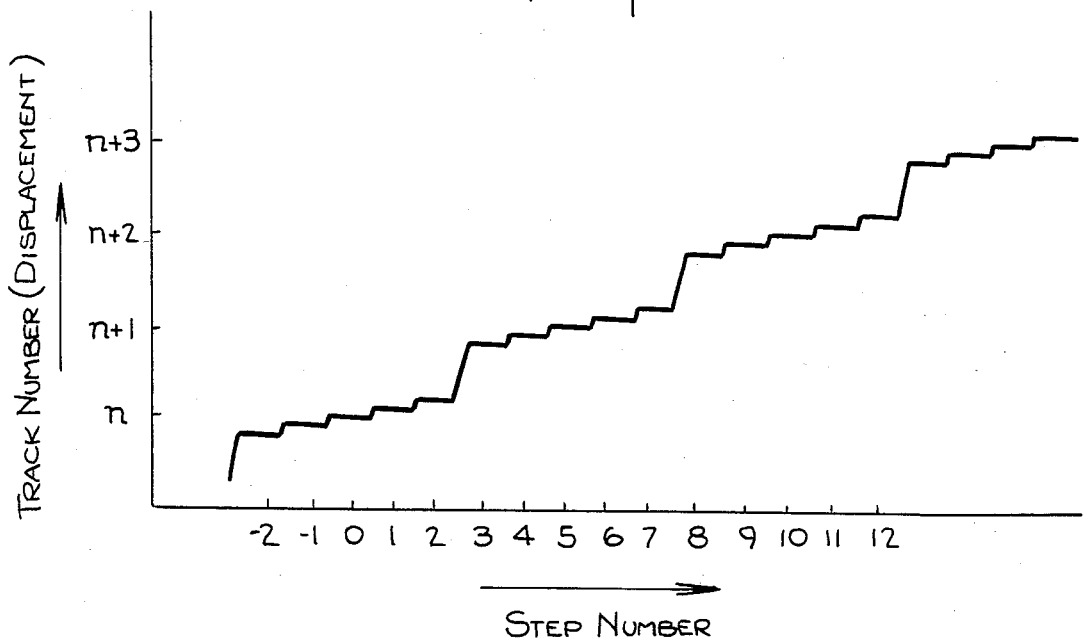
FIG. 2 is a graph depicting motion conversion characteristics of a device according to the invention.

With reference to FIG. 1(a), a head 10 for accessing an information recording medium 60 takes the form of a transducer having a head tip 11 supported on a head base 12. The head 10 is mounted on a movable head carriage 20 guided by two guide rods 21. A disc cam 41 which serves as a motion converting element is rotatably driven by a stepping motor 30 which functions as a driving force generating means. The cam 41 and a cam follower 42 mounted on the carriage 20 to rollingly contact the cam 41 form a motion converting mechanism 40. Both guide rods 21 are fixedly secured at their right ends in FIG. 1 to a structural member 100 of the present device. The left ends (not shown) of the guide rods are also fixed in the same way. Both guide rods 21 transverse insertion holes provided in the head carriage 20 to movably support and guide the head carriage 20. Compressible coil springs 22 are arranged around the peripheral surfaces of the guide rods 21 between the right side of the head carriage 20 and the left side of the structural member 100 shown in FIG. 1(a), thereby constantly exerting on the head carriage 20 a biasing force directed towards the cam 41. For this reason, the cam follower 42 mounted on the carriage 20 will always rollingly contact the cam 41 elastically. Disc-shaped recording medium 60, for example, a floppy disc, is rotatably driven by a spindle motor (not shown) and is positioned as indicated by the dash-double dot line so that annular information recording tracks 70 formed on the medium 60 can be traced by the head 10. In accordance with the present invention, the motion converting cam element 41 has a characteristic peripheral surface of edge as shown in FIG. 1(b), which is an enlarged view of portion b of FIG. 1(a). As illustrated in FIGS. 1(a) and 1(b), the distance r between the axis of rotation O of the cam 41 and a position P on its peripheral surface contacting the cam follower 42 increases in the counterclockwise direction with fine step-by-step increments 80 and with each larger incremental steps 82 at regular intervals. Each fine step-by-step incremental portion 84 constitutes a fine step pitch shifting region to provide the head 10 with a relatively fine, tracking control displacement for proper tracking with respect to a specific track. Each larger step portion 82 constitutes a rough pitch shifting region to provide the head 10 with a relatively large abrupt displacement for the shift between the tracks. The motion conversion characteristics of the cam 41 will be understood more clearly from the graph of FIG. 2. In FIG. 2, the angle of rotation of the stepping motor 30 is represented on the horizontal axis by the number of steps and the displacement of the head (corresponding to the above-mentioned distance r) is represented on the vertical axis by the track number on the medium. With respect to the vertical axis, the distance between adjacent tracks, for example, is measured from the center of the n-th track to the center of the adjacent n+1-th track and is the so-called track pitch. For an electronic still camera, the standard pitch is 100 μm.

Figure 9:
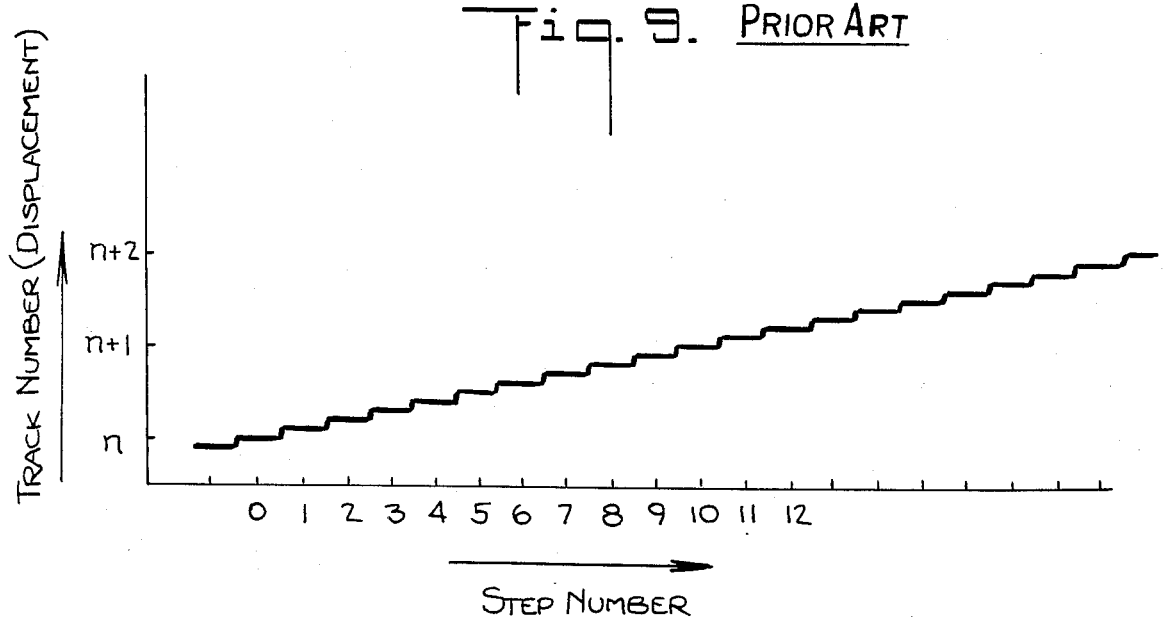
FIG. 9 is a graph showing fine stepwise characteristics of yet another conventional cam.
Figure 5:
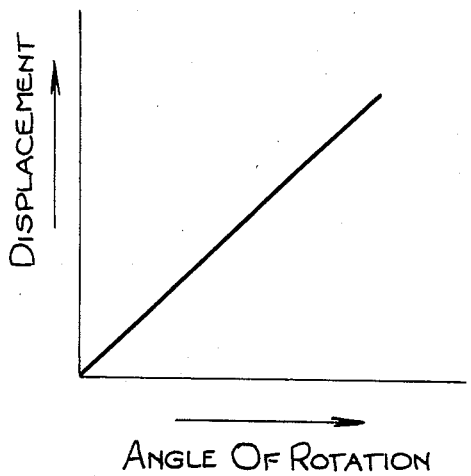
FIG. 5 is a graph showing the relationship between the angle of rotation of a cam as a motion converting element and the output displacement in the conventional device shown in FIG. 4.
Figure 7:
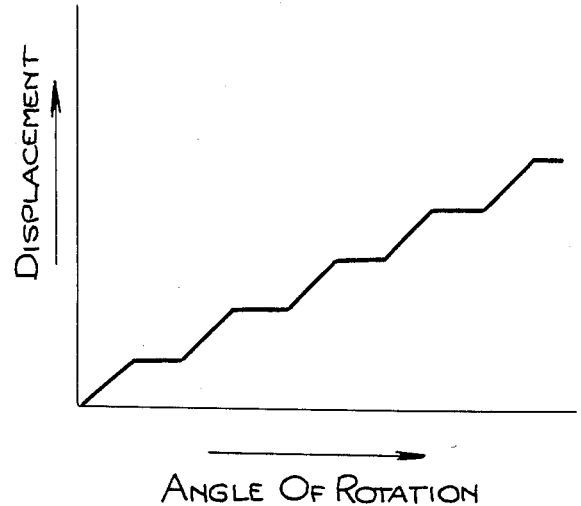
FIG. 7 is a graph showing stepwise characteristics of a different conventional motion converting cam.
Figure 6:
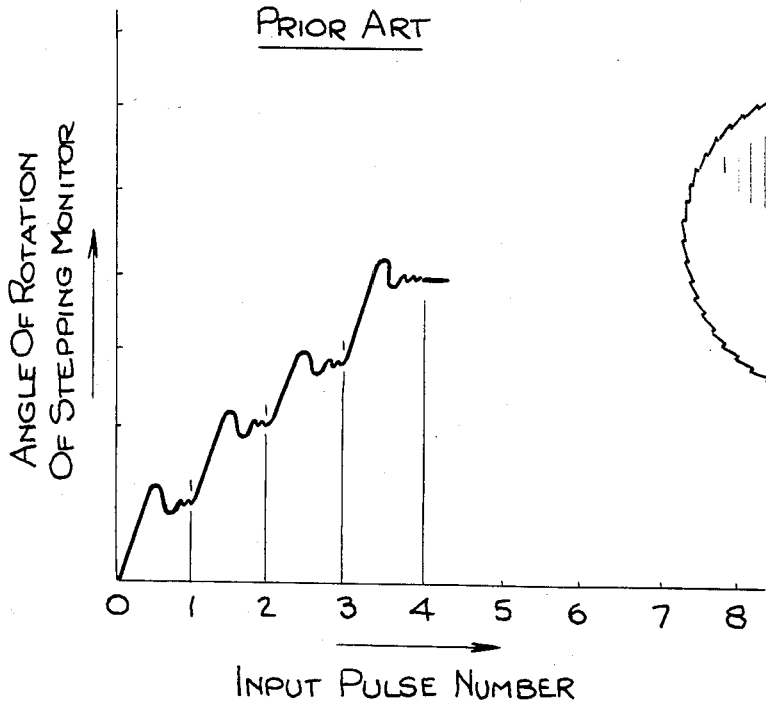
FIG. 6 is a graph showing the relationship between the number of the input pulses and the output angle of rotation of a stepping motor.
Figure 8:
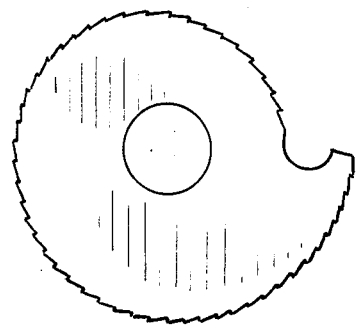
FIG. 8 is a plan view of the cam having the motion conversion characteristics shown in FIG. 7.

The operation of the device having the above-described structure will now be described. It is assumed that when the tip 11 of the head 10 traces the regular position of the n-th track on the recording medium 60, the cam 41 is in its standard position of rotation, i.e., at the center step position of O in a fine step pitch shifting region 84 shown in FIG. 2. In reality, the track may be displaced from its regular position because of a positional error by a recording apparatus at the time of track recording, because of eccentricity or inexact displacement by a rotational drive in a reproducing apparatus, etc. Therefore, in order that the head 10 may trace the n-th track on the rotating recording medium 60 correctly, tracking control is necessary for finely displacing the head 10 to follow the actual position of the track. In this embodiment, in order to effectuate tracking control for the n-th track, driving pulses are supplied from a servo circuit (not shown) to the stepping motor 30 to cause an angle of rotation of, for example, one or two steps (1 or 2 units on the horizontal axis in FIG. 2) in the positive direction (the counterclockwise direction in FIG. 1), or one or two steps (−1 or −2 units on the horizontal axis in FIG. 2) in the opposite direction, whereby the fine step pitch shifting region 84 of the cam 41 operates to properly implement fine tracking control. Responding to fine stepping revolution of the cam 41, the cam follower 42 is relatively dislodged into an adjacent fine step of the cam 41 very easily. Accordingly, a delicate and very sensitive tracking control can be performed. On the other hand, when the head 10 accesses the n+1-th track from the n-th track, the rough pitch shifting region 82 provided between the second and third fine steps 80 from the zero position of the n-th fine step portion 84 operates to provide the head 10 with a relatively abrupt displacement so that the head 10 shifts quickly from the n-th to n+1-th track position. Naturally, the tracking control for the n+1-th track is made in the same way as the n-th track. The head access and tracking control for the n+2-th, n+3-th, ... tracks are also made in the same manner. In other words, the cam 41 as a motion converting element operating as described above is such that the fine step pitch shifting region 84 is provided in a predetermined range necessary for tracking control (±2 steps in FIG. 2) around the standard or zero position of each track (step positions 0, 5, 10, ... in FIG. 2) and each rough pitch shifting region 82 is provided between these respective fine step pitch shifting regions 84. In this embodiment, inasmuch as each fine pitch shifting region 84 is formed by a plurality of fine steps 80 each having a pause range as stated above, the influence of the ripple components of the rotation of the motor 30 (therefore the cam 41), if any, can be minimized to realize stable tracking at an optimum fine step. Moreover, it will be clearly understood how increased the speed of the head access by virtue of the rough pitch shifting regions 82 of the motion converting element according to the present invention is if the motion converting characteristics in FIG. 2 are compared with the characteristics in FIG. 9 of a cam formed with a fine step pitch shifting region only.

The present invention is not limited to the above embodiment: many variations and modifications can be made within the scope of the present invention. For example, the cam 41 and the cam follower 42 of the movement converting mechanism 40 of FIG. 1 may be replaced with a cam 41' having a spiral groove 86 and a pin-shaped cam follower 42' projecting into the groove, as shown in FIG. 3. The grooved cam 41' serves as a movement converting element and is formed to be mounted in the same manner as the cam 41 in FIG. 1 and rotatably driven by the stepping motor 30. The pin-shaped cam follower 42' is provided in place of the cam follower 42 on the head carriage 20 in FIG. 2. Clearly, the positional relationship between the grooved cam 41' and the cam follower 42' should be adjusted so that the tip of the cam follower 42' can trace the groove 86 of the cam 41' correctly. The cam groove 86 is formed to include fine step pitch shifting regions and rough pitch shifting regions in such a manner that the relationship between the angle of rotation of the cam 41' and the distance from the axis of rotation of the cam 41' to the position where the cam follower 42' slidably contacts the cam groove is identical to that shown in FIG. 2. Therefore, when the elements shown in FIG. 3 are used as a motion converting mechanism in a device pursuant to the present invention, the mechanism provides the same operation and effect as the embodiment described above with reference to FIGS. 1(a) and 1(b). Moreover, when the elements shown in FIG. 3 are used as a motion converting mechanism, biasing means 22 as shown in FIG. 1(a) can be omitted by selecting the shape and dimension of the groove properly.

As described above, in a motion converting mechanism of an accessing device in accordance with the present invention, a highly precise and stable tracking control is achieved by the fine step pitch shifting regions and a fast accessing is realized by the rough pitch shifting regions.

What is claimed is:

1. An assembly for accessing an information recording medium comprising a plurality of successive tracks disposed laterally adjacent to one another and at least partially parallel to one another, said assembly comprising:

transducing means including a transducer element for accessing said tracks to transfer information coding signals between said tracks and signal processing means;

support means including a carriage for supporting said transducer and advancing said transducer in a direction intersecting successive ones of said tracks;

driving force generating means for generating driving force to bring about a displacement of said carriage in said direction; and motion converting means operatively connected to said driving force generating means and to said carriage for converting an input motion from said driving force generating means to an output motion transmitted by said motion converting means to said carriage, said motion converting means having a motion conversion characteristic including a plurality of fine step pitch shifting regions spaced from each other and further including at least one rough pitch shifting region linking said fine step pitch shifting regions.

2. An assembly in accordance with claim 1, wherein said transducer comprises a magnetic head.

3. An assembly in accordance with claim 1, wherein said transducer comprises a photodetector means.

4. An assembly in accordance with claim 1, wherein said driving force generating means comprises a stepping motor.

5. An assembly in accordance with claim 1, wherein said motion converting means comprising a disc cam.

6. An assembly in accordance with claim 1, wherein said motion converting means comprises a grooved cam.

* * * * *

UNITED STATES PATENT AND TRADEMARK OFFICE
CERTIFICATE OF CORRECTION

PATENT NO. : 4,827,365

DATED : May 2, 1989

INVENTOR(S) : IDA, Masatoshi

It is certified that error appears in the above-identified patent and that said Letters Patent is hereby corrected as shown below:

Column 3, line 63, "of" should read --or--.

Column 5, line 2, "region" should read --portion--.

Column 6, line 5, "fast accessing" should read --fast track accessing--.

Signed and Sealed this

Nineteenth Day of June, 1990

Attest:

HARRY F. MANBECK, JR.

*Attesting Officer*     Commissioner of Patents and Trademarks